US 12,453,998 B2

(12) United States Patent
Baum

(10) Patent No.: US 12,453,998 B2
(45) Date of Patent: Oct. 28, 2025

(54) DEVICE FOR THE INTERNAL BENDING OF PIPES FOR PIPELINES

(71) Applicant: BENDFORCE GMBH, Celle (DE)

(72) Inventor: Oliver Baum, Hannover (DE)

(73) Assignee: Bendforce GmbH, Hambühren (DE)

( * ) Notice: Subject to any disclaimer, the term of this patent is extended or adjusted under 35 U.S.C. 154(b) by 0 days.

(21) Appl. No.: 18/682,757

(22) PCT Filed: Aug. 11, 2022

(86) PCT No.: PCT/EP2022/072586
§ 371 (c)(1),
(2) Date: Oct. 29, 2024

(87) PCT Pub. No.: WO2023/017129
PCT Pub. Date: Feb. 16, 2023

(65) Prior Publication Data
US 2024/0342780 A1    Oct. 17, 2024

(30) Foreign Application Priority Data
Aug. 12, 2021   (DE) ...................... 10 2021 121 057.7

(51) Int. Cl.
*B21D 9/03* (2006.01)
(52) U.S. Cl.
CPC ..................... *B21D 9/03* (2013.01)
(58) Field of Classification Search
CPC ... B21D 9/00; B21D 9/01; B21D 9/03; B21D 9/04
See application file for complete search history.

(56) References Cited

U.S. PATENT DOCUMENTS

| | | | |
|---|---|---|---|
| 3,834,210 A | 9/1974 | Clavin et al. | |
| 5,092,150 A | 3/1992 | Cunningham | |
| 2015/0266075 A1* | 9/2015 | Baum | B21D 9/00 72/399 |

FOREIGN PATENT DOCUMENTS

| | | |
|---|---|---|
| DE | 102008060897 A1 | 6/2010 |
| DE | 102012012139 A1 | 12/2013 |
| GB | 1270059 A | 4/1972 |
| JP | S58138523 A | 8/1983 |

* cited by examiner

*Primary Examiner* — Debra M Sullivan
(74) *Attorney, Agent, or Firm* — Mark Rodgers

(57) ABSTRACT

The invention relates to a device for the internal bending of pipes (100), in particular of coated pipes, for pipelines with a base body (11) which can be positioned in the pipe and which has on at least one side (12), preferably the underside, at least one support surface (13) with an inner wall (101) of a pipe (100) to be bent, wherein the base body (11) has a support surface (13) opposite, preferably the upper side, on which at least one tool for introducing a bending force into the pipe (100) is movably provided, wherein the tool is movable relative to the base body (11) via at least one actuator (18, 20) for introducing the bending force. The invention provides that the tool is provided as a tool element (21) which has at least two bending force introduction sections (28, 29) for introducing the bending force into the pipe (100), which are each movable relative to the base body (11) by at least one actuator (18, 20).

20 Claims, 18 Drawing Sheets

DEVICE FOR THE INTERNAL BENDING OF PIPES FOR PIPELINES

TECHNICAL FIELD

The invention relates to a device for the internal bending of pipes, in particular coated pipes, for pipelines with a base body which can be positioned in the pipe and which has on at least one side, preferably the underside, at least one support surface with an inner wall of a pipe to be bent, wherein the base body has a support surface on the opposite side, preferably the upper side, on which at least one tool for introducing a bending force into the pipe is movably provided, wherein the tool can be moved relative to the base body via at least one actuator for introducing the bending force.

These pipes are used for pipelines that transport large quantities of liquids or gases over long distances. The transported media include crude oil, chemicals and/or water. Other pipes made of various materials such as copper, stainless steel, brass etc. can also be bent. The technique is particularly suitable for pipes with a relatively small wall thickness in relation to the diameter, as these are otherwise very difficult or impossible to bend.

Pipelines exist worldwide for transporting both liquid and gaseous substances over long distances. These pipelines are generally made up of sections of individual pipes with lengths of 6 to 18 meters. The pipes usually have a diameter of 4 to well over 75 inches and are welded together to form a pipeline on the surface, underground and/or in water. The pipelines often follow the general contour of the earth's surface. The course of the pipelines can also be diverted or otherwise routed around obstacles, particularly in its horizontal and vertical extension.

A major challenge in the planning and construction of such pipelines is joining the ends of the individual pipes with high-quality welded joints. In order to follow the contour of the earth's surface and avoid any obstacles in the course of the pipelines, changes of direction in the pipeline are necessary. When creating the directional changes, an attempt is made to avoid welded joints as far as possible. Changes of direction in pipelines can be created by welding individual pipe sections with miter cuts, especially for pipes with a large diameter. In order to minimize the number of welded joints and thus increase the reliability of the pipelines, the change of direction in the pipe must be created by bending the pipe. In addition, the curved pipes allow significantly better flexibility on the construction site and much tighter radii in the routing.

As is usual with large-diameter pipes, a bend is achieved by carrying out numerous small, arranged bending steps in the pipe. The desired bending radius is therefore produced in the form of a polygon, even if this is ideally not recognizable on the finished bend. With such a bending system, the operator has complete control over the number of incremental and/or stepwise bends to be produced, over the distance between the incremental and/or stepwise bends and the extent of each incremental and/or stepwise bend in the pipe. Experienced operators can efficiently control the pipe bending machines to produce precise bends in the pipes while minimizing the number of damaged or incorrectly bent pipes that result in wasted time and raw materials such as energy and pipes.

After each bending process, the pipe and bending device must be moved relative to each other with high precision. Both a movement of the pipe in the bending device and a movement of the bending device itself are possible. The latter variant has the disadvantage that the pipe must be realigned in the bending device. Moving the large-diameter pipes, moving the mandrel precisely and checking the bend produced involves a great deal of manpower and energy.

BACKGROUND ART

Due to the size of the pipes to be bent, bending devices are generally massive in nature and are hydraulically operated. A bending device is generally known from U.S. Pat. Nos. 3,834,210 and 5,092,150. Such bending devices have means for gripping the pipe, moving the pipe in the bending device and creating the bend in the pipe. These devices are all hydraulically operated under the control of an operator.

DE 600 28 484 T2 shows a conventional bending device adapted to produce bends in a large diameter pipe. The bending device generally includes a reinforced frame to which the components are anchored to prevent relative movement. The main components of the pipe bending device include a bending tool, a mandrel, a support device and a mounting shoe. The bending tool is a fixed and stationary body in relation to the frame with a curved surface facing the pipe, whereby the pipe is pressed against the bending tool during the bending process. The support device is actuated by hydraulic pressure during the bending process and pivoted in the direction of the bending tool. Meanwhile, the fixing shoe holds the pipe in place. In the working areas of the bending device, forces are transferred to the pipe during the bending process by means of the bending tool, the support device and the fixing shoe, causing it to deform. The mandrel is a flexible structure with links that allows the pipe to be bent without changing the circular nature of the pipe at the bending point. Such mandrels are known in the prior art and are usually composed of spring steel strips/sheets.

As the above-mentioned bending device shows, bending devices usually have three working areas in which the forces required to bend the pipe are transmitted to the pipe. During the bending process, active force is applied in one working area by means of a hydraulic cylinder. The other passive working areas serve as abutments and are connected to the active working area via the frame. DE 696 03 499 T2 shows a bending device in which the middle of the three working areas is designed as an active working area.

Large forces must be applied to bend such large-diameter pipes. The necessary bending devices and mandrels must be correspondingly large and massive. The equipment required for the use of such large bending devices, such as diesel units, hydraulic pumps and mandrels, is also large in volume and mass. Overall, it can be seen that the operation of such (external) bending devices places high demands on space requirements during transportation and at the place of use. The high logistics costs are compounded by the costs of consumables, in particular fuels and energy sources.

DE 600 28 484 T2 also discloses a method for automating a bending device and a control system with a programmable processor to reduce the amount of work involved. Automation is particularly necessary to perform incremental and/or step-by-step bends with a high degree of repeatability and accuracy. For higher quality, the duration of the entire bending process should be reduced, thus simultaneously reducing the transportation weight and the energy requirement of the bending device.

A device mentioned at the beginning and a corresponding method are known from DE 10 2008 060 897. Here, a bending device is provided which can be positioned completely inside the pipe to be bent, at least with its parts which are essential for the function of the bending machine. This makes it possible for the bending device to apply the forces required for bending the pipe to the pipe from the inside. This results in less work and a lower energy requirement. Furthermore, damage to a coating applied to the outside of the pipe, for example a paint finish, thermal insulation and/or synthetic resin reinforcement, is avoided to a certain extent.

JP S58138523 A also discloses a bending device that performs the bending inside the pipe. It has two active working areas (front and rear), whereas the middle working area is passive. In this case, the precise application of force to both separate working areas is disadvantageous.

DE 10 2012 012 139 A1 discloses an internal pipe bending device in which at least three contact elements are provided on a carrier, two contact elements being arranged on a first side of the carrier at the ends of the carrier and one contact element being arranged on a second side of the carrier opposite the first side in the middle of the carrier. This makes it possible for the bending device to move within the tube like a rocker.

SUMMARY OF THE INVENTION

The invention is based on the task of creating a bending device with which pipes can be bent from the inside with significantly higher forces and at the same time with greater accuracy. In addition, the design of the machines is to be simplified in order to achieve the longest possible service life.

The task is solved in that the tool is provided as a tool element which has at least two bending force introduction sections for introducing the bending force into the pipe, each of which can be moved relative to the base body by at least one actuator.

This allows the bending energy to be optimally transferred to the pipe to be bent in a particularly simple and precise manner.

A further teaching of the invention provides that the at least two bending force introduction sections are provided in the outer region of the tool element.

A further teaching of the invention provides that the tool element has a contact section which is provided between two outer bending force introduction sections, preferably centrally. This section is preferably connected to the two surrounding sections. This makes it easy to support the pipe during bending in order to avoid unwanted changes in shape.

It is advantageous that the third contact section can be moved via one or more actuators, particularly in a radial direction. This allows the support effect in the area of plastic deformation of the pipe to be controlled in a particularly advantageous manner.

A further teaching of the invention provides that the bending force introduction sections and/or contact sections are elastically deformable and/or can expand. This is a simple way of counteracting ovalization.

A further teaching of the invention provides that at least one elastic section is provided between the at least two bending force introduction sections, and/or the middle contact section is elastic in itself in the direction of the bending to be generated.

It is advantageous that the elastic section is provided by a material reduction in the tool element, preferably in the form of recesses in the tool element. A preferred embodiment of this is the provision of the elastic area in the form of ribs and recesses between the ribs. The ribs are particularly advantageously designed in such a way that they allow the necessary deformations and at the same time can absorb the necessary supporting forces. The ribs can also take on free shapes that specifically allow the desired deformations. These are determined on the computer using topology optimization, for example.

It is also advantageous that the at least one area with a material reduction in the workpiece element is at least partially filled with an elastic material. In particular, the ribs and recesses mentioned are preferably completely or partially filled with an elastic material. The elastic material is compressed in the ribs during bending and thus pressed out of the ribs. This provides additional support for particularly thin-walled pipes.

A further teaching of the invention is that the actuators are hydraulic cylinders or similar linear actuators such as pneumatic cylinders, threaded spindles and/or piezo elements. This allows the force to be applied directly to the pipe particularly effectively and without losses.

A further teaching of the invention provides for hydraulic cylinders with one or more pistons arranged one behind the other. The pistons can be accommodated in a common or several separate cylinder blocks and act on a common force transmission element. This element is either part of the upper tool element or transmits the force to it and is rotatably mounted relative to the upper tool in order to avoid impermissible forces on the cylinders.

A further teaching of the invention provides that the actuator moves the tool element away from the base body, preferably upwards, and in an arc from the base body towards the inner wall of the pipe. This ensures that there are no relative displacements between the tool and the pipe or between the actuator and the tool. Due to its elasticity, the tool precisely follows the course of the inner surface of the pipe and compresses to the same extent.

A further teaching of the invention provides that the actuators move the outer bending force introduction sections of the tool element upwards and in an arc from the base body towards the inner wall of the pipe. This ensures that there are no relative displacements between the bending force introduction sections and the pipe or between the actuator and the bending force introduction sections. Due to its elasticity, the tool precisely follows the course of the inner surface of the pipe and compresses to the same extent.

It is also advantageous that the actuators and the bending force introduction sections of the tool element are arranged and designed in such a way that the actuators can be used to move the outer bending force introduction sections of the tool part away from the base body, preferably upwards, and in an arc from the base body towards the inner wall of the pipe.

A further teaching of the invention is that the lower contact surface is curved. In this way, the optimum bend of the pipe can be specified in a simple manner.

A further teaching of the invention is that a chassis is provided on the base body for movement in the pipe. This allows the bending device to be moved in the pipe in a simple manner.

A further teaching of the invention provides, that the running gear has at least two running gear elements, preferably with rollers, which are preferably located on the end faces and/or in front of and behind the lower contact element and can be retracted, preferably via spring elements. This enables safe movement in the interior of the pipe in a simple manner.

A further teaching of the invention provides that at least one running gear element is arranged in the area of the lower contact element and is arranged to be retractable into the main body via a spring force. It has been shown that this makes it possible to dispense with active lifting/lowering in a simple manner.

A further teaching of the invention provides at least a push rod and/or push chain for pushing and pulling the bending device into and out of the pipe to be bent/bent, which is attached to a base outside the pipe and can be driven from there via a mechanism. This makes it easy to provide movement of the bending device in the pipe.

A further teaching of the invention is that the position of the machine in the pipe can be detected via the push rod/push chain. This enables precise position control of the device in the pipe in a simple manner.

A further teaching of the invention provides that the push rod/push chain is held in a torsionally rigid manner on a base outside the pipe. In this way, rotations of the bending device in the pipe can be largely prevented or at least detected.

A further teaching of the invention provides for at least one roller in the upper area of the base body and/or tool. This roller is not resiliently mounted like the lower rollers, but protrudes above the tool geometry at an adjustable distance. After the first bending step, the roller(s) simply prevents the tool element from coming into contact with the pipe as soon as the lower rollers press the machine upwards via spring force.

A further teaching of the invention provides that at least one chassis element is pretensioned via at least one pretensioning element to such an extent that the base body and the tool are free in the air. Preferably, the pretensioning element is a spring element, a pneumatic cylinder or an only partially filled hydraulic cylinder, where the pretension is preferably adjustable. If the weight of the machine is exceeded, e.g. by the upper tool element resting in the pipe or by the upper roller resting after the tool element has been unloaded, the preloaded suspension begins to collapse. The lower rollers of the chassis and the upper roller(s) are in contact for the travel movement when the pipe is bent. When driving through a straight pipe, the upper roller can be in contact.

A further teaching of the invention provides that the tool element is in contact with the inner wall of the pipe to be bent with the at least two bending force introduction sections over substantially the entire surface, preferably over the entire length of one side, preferably the upper side, of the tool element.

A further teaching of the invention provides that at least one contact element and/or at least one bending force introduction section is coated with elements made of plastic, brass, aluminum, wood.

A further teaching of the invention provides, that the tool element and/or the base body in the unloaded state is smaller in diameter than the inner diameter of the pipe, so that the device is movable in the pipe.

A further embodiment of the invention provides that the tool is at least partially slotted in its longitudinal direction in order to enable a slight elastic expansion in the radial direction.

A further teaching of the invention provides that the tool element extends beyond an end face of the base body on at least one side, so that there is at least one overhang area.

A further teaching of the invention provides that the base body and/or the tool element are constructed in two parts, preferably in the form of an inner base body and an outer base body and/or an inner tool element and an outer tool element.

A further teaching of the invention provides that the outer base body and/or the outer tool element are provided in the form of a cover element, preferably made of plastic.

A further teaching of the invention provides that the tool element is constructed in several parts, wherein the tool element is constructed from at least two bending force introduction section parts and a contact section part, which is preferably designed to be elastic, which are connected to one another.

It is advantageous that the contact section part consists of at least two beams, that the beams are connected to the at least two bending force introduction section parts, and that at least two rib elements are arranged on the beams.

It is also advantageous that the rib elements are shaped like an arch, which sit on one side of each beam; the connection is preferably loose. Alternatively, it is advantageous that the rib elements have a positive connection to the beam. This prevents severe deformation of the ribs and achieves a better support effect in the pipe.

It is also advantageous that the at least two rib elements are spaced apart so that there is a gap. This allows the rib elements to move into the gap and towards each other.

It is particularly advantageous that at least one elastically deformable element is provided in the intermediate space. This can deform elastically when the ribs are moved into the gap, support the rib elements and/or move outwards like a bead, so that the pipe to be bent is supported.

A further teaching of the invention provides that at least one actuator is provided in the region of the contact section part. Advantageously, one actuator is arranged centrally under each of the at least two beams.

BRIEF DESCRIPTION OF THE DRAWINGS

The invention is explained in more detail below with reference to a preferred embodiment in conjunction with a drawing. It shows.

DESCRIPTION OF THE EMBODIMENTS

Figure 1:
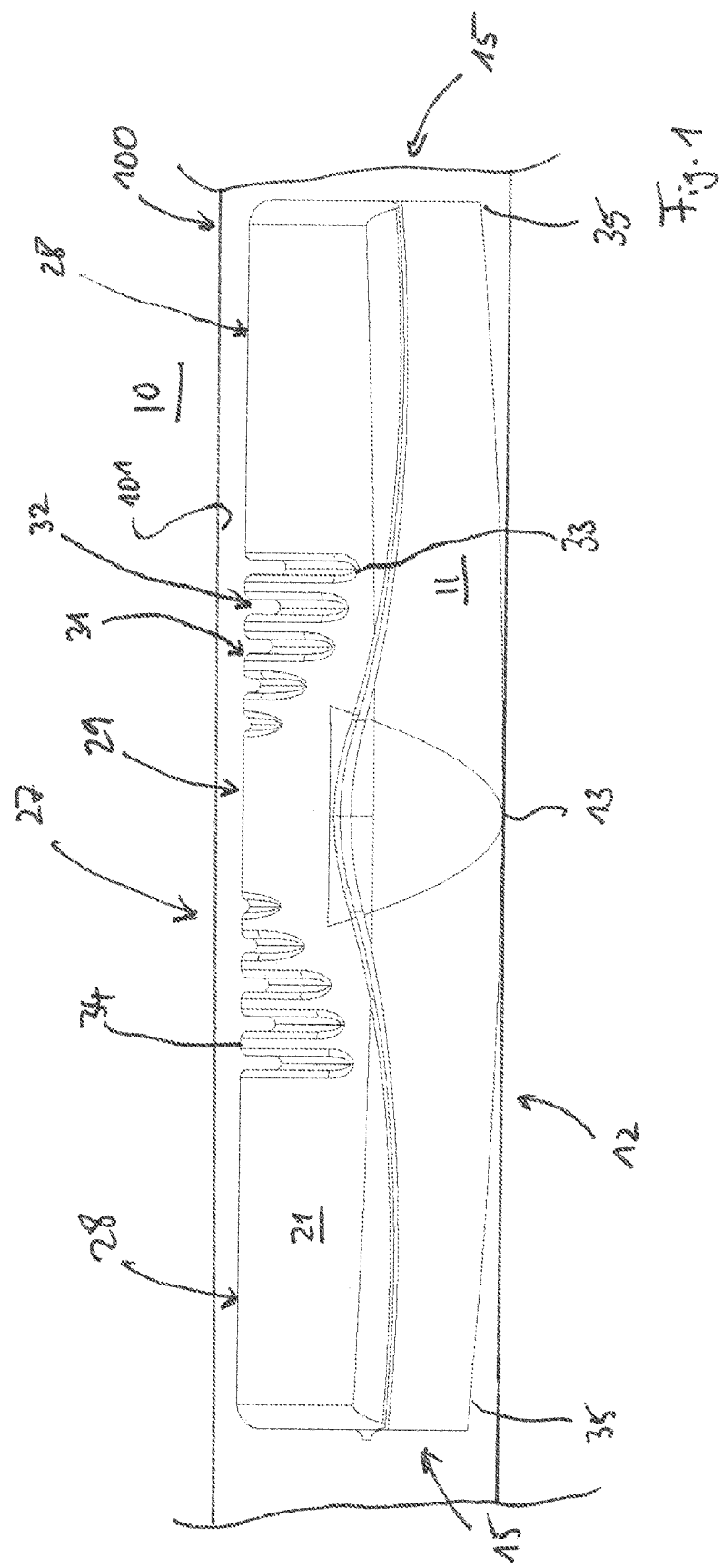
FIG. 1 a side view of a first embodiment of a bending device according to the invention in a pipe to be bent, FIG. 2 a spatial representation of FIG. 1, FIG. 3 a sectional view of the longitudinal axis of FIG. 1, FIG. 4 a sectional view of a part of the first embodiment of the device according to the invention transverse to the longitudinal axis, FIG. 5 a side view of a second embodiment of a bending device with chassis according to the invention, FIG. 6 a second side view of FIG. 5, FIG. 7 a side view of a third embodiment of a bending device according to the invention with chassis and push rod, FIG. 8 a spatial representation of FIG. 7, FIG. 9 a spatial representation of a guide of a push rod for FIGS. 7 and 8, FIG. 10 a side view of a fourth embodiment of a bending device according to the invention with chassis and projecting bending tool, FIG. 11 a spatial partial representation of FIG. 10, FIG. 12 a side view of a fifth embodiment of a bending device according to the invention with chassis, projecting bending tool and covers of the contact sections FIG. 13 a spatial representation of FIG. 12, FIG. 14 a side view of a basic design without covers for the embodiment shown in FIG. 13, FIG. 15 a spatial representation of FIG. 14.

FIG. 1 shows a first pipe bending device 10 according to the invention with a base body 11. The base body 11 has an underside 12. The underside 12 has a lower contact surface 13 in the middle. The underside 12 is preferably completely curved here. Alternatively, a partially curved design is also possible.

Also possible but not shown is a pipe bending device 10 tilted by up to 90 degrees for horizontal bending of the pipe 100.

The curved shape is designed so that the radius is narrower than the final intended radius of a finished bent pipe 100. The bend of the underside 12 is essentially convex. The shape of the contact surface 13 can be designed as a free form in order to achieve optimum roundness of the pipe after bending.

The base body 11 is preferably designed as a single piece. Alternatively, the base body can be divided in the longitudinal direction, for example to make it easier to manufacture the base body 11.

Figure 2:
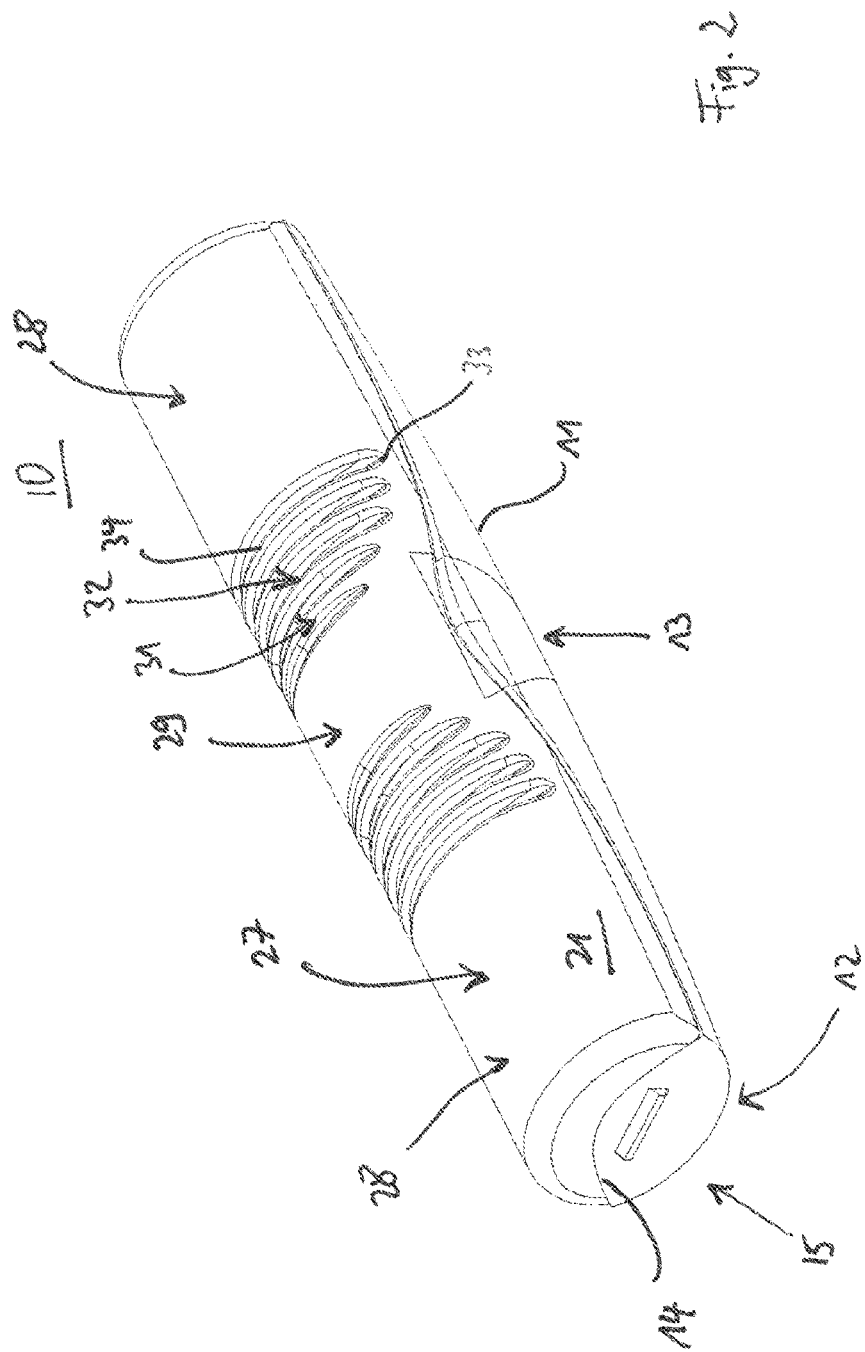

Furthermore, the base body 11 has an upper side 14, which is preferably curved with a maximum above the lower contact surface 13. The upper side 14 has a concave shape at the end faces 15 of the pipe bending device 10, as shown in FIG. 2. The base body 11 is preferably designed in such a way that it can absorb the highest possible forces and at the same time offers sufficient space for the necessary attachments and a tool element 21.

Recesses 16, which are connected to a channel 17, are provided inside the base body 11 on a front side and a rear side of the base body 11. Actuators 18, in this case preferably hydraulic cylinders, are arranged in the recesses 16, which can be extended upwards in the direction of arrow A and retracted in the opposite direction to arrow A.

Figure 3:
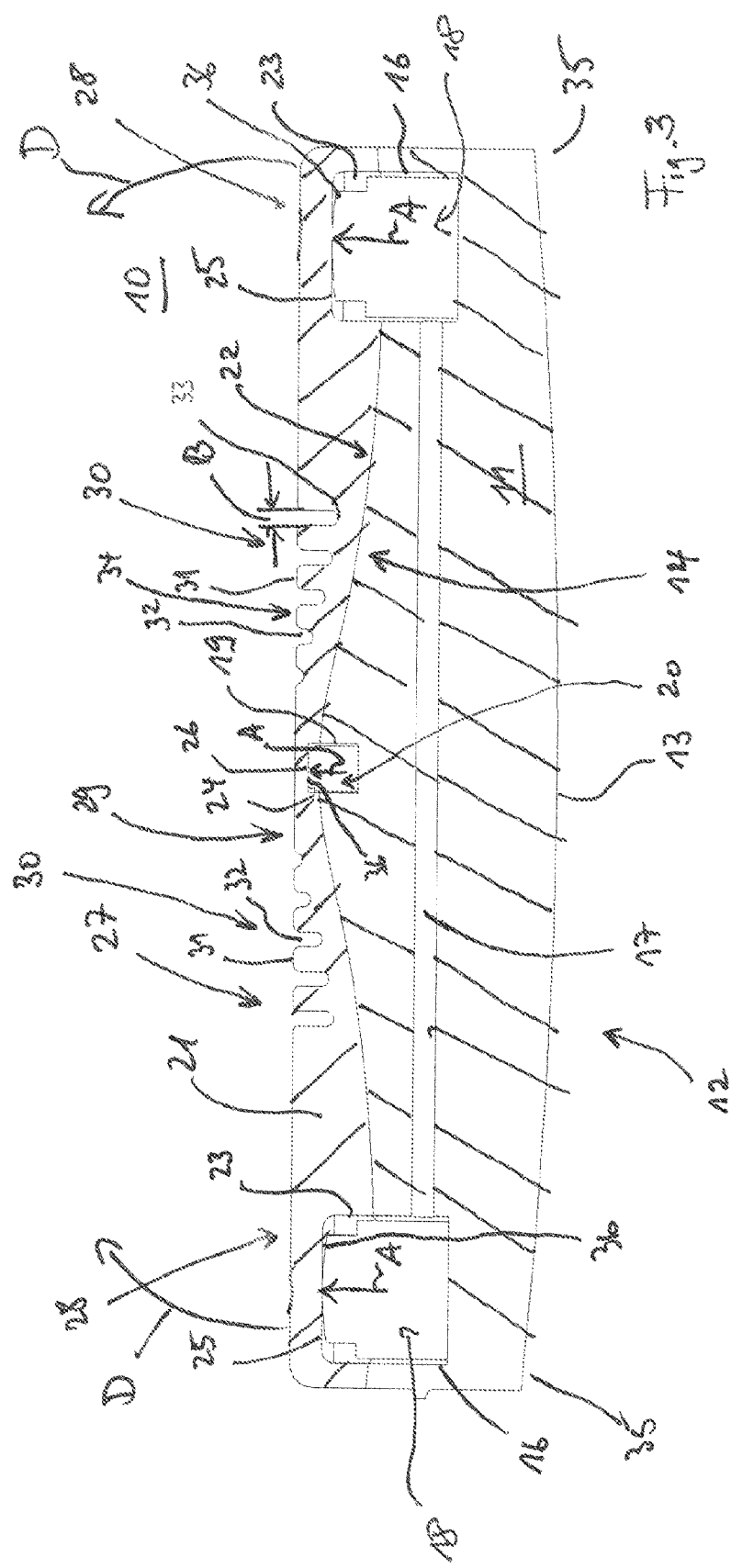

In addition, as shown here in FIG. 3, further recesses 19 can be provided in the area of the lower contact surface 13 in the upper side 14 between the recesses 16, in which one or more further actuators 20, preferably a hydraulic cylinder in this case, are arranged. This can also be extended and retracted in the direction of arrow A.

Connecting lines not shown can be provided in channel 17 between the actuators 18 for the power supply and the control system. If provided, there is also an undisplayed connection to actuator 20 or other actuators. Preferably, these are hydraulic lines and valves as well as cables for sensors or electrically driven actuators and for possible connection of lines of the trolleys.

A tool element 21 is arranged on the upper side 14. This has a lower side 22, which preferably corresponds to the upper side 14 of the base body 11 in such a way that it can be arranged on the upper side 14 of the base body 11. The underside 22 of the tool element 21 has corresponding recesses 23, which are arranged above the recesses 16. Furthermore, the underside 22 has a recess 24, which is arranged correspondingly above the recess 19 when the tool element 21 is arranged on the base body 11.

The recesses 23, 24 each have a contact surface 25, 26 against which a contact surface 36 of one of the actuators 18, 20 acts during its movement in the direction of arrow A and on which the actuator 18, 20 exerts a corresponding force in the direction of arrow A.

Furthermore, the tool element 21 has an upper side 27. Preferably, the upper side 27 is designed in such a way that it essentially corresponds to the inner radius of the pipe 100 to be bent in the contact area with the inner wall 101 of the pipe 100. When unloaded, the radius can be smaller or the same size so that the pipe bending device 10 can be moved in and out of the pipe. When loaded, the radius can widen, for example, if necessary.

Preferably, the upper side 27 has two outer bending force introduction sections 28 and a central contact section 29.

The outer bending force introduction sections 28 and the middle contact section 29 are preferably separated from each other by elastic deformation sections 30.

Furthermore, the tool element 21 preferably consists of a contiguous part or several mechanically connected parts. The tool element 21 is designed to be elastic at least in the center in order to follow the inner wall 101 of the pipe 100 during bending. Several elastic deformation sections 30 can also be provided next to the center of the upper part in order to apply a stronger/different force to the inner wall 101 of the pipe 100. The force and position of the force application from the tool element 21 to the pipe 100 can be adjusted via the elasticity and original shape of the tool element 21.

The elastic deformation sections 30 preferably have ribs 31 and recesses 32, which extend in the circumferential direction on the upper side 27 of the tool element 21. The recesses 32 have a width B. Preferably, the recesses 32 are of different depths depending on the elasticity of the deformation section 30 to be achieved. In FIG. 3, the recesses 32 become deeper as the distance from the central contact section 29 increases. Here, the depth is preferably selected such that the distance between the deepest point 33 of the recess 32 with the underside 22 of the tool element 21 is constant in relation to the respective recess 32. Alternatively, the distances can be varied depending on the elasticity to be achieved.

If the actuators 18, 20 are extended in the direction of arrow A, the upper side 27 of the tool element 21 is first moved against the inner wall 101 of the pipe 100 until the bending force introduction sections and the middle contact section 28, 29 and possibly also the upper sides 34 of the ribs 31 are in contact with the inner wall 101.

The central contact section 29 serves to support the transformation of the pipe 100 in order to prevent deformation of the pipe away from maintaining the circumferential shape of the pipe 100. It has been shown that it is advantageous if the middle contact section 29 is also designed to be elastically deformable.

Furthermore, it has been found that it is advantageous for improved support that an actuator 20, preferably a hydraulic cylinder, can be provided here, which can exert a force in the direction of arrow A via the central contact section 29 on the inner wall 101 of the pipe 100 during bending. The actuator 20 can be used to control the supporting effect of the central area with particular precision, for example for very thin-walled pipes.

In an alternative embodiment, the outer bending force introduction sections 28 and the middle contact section 29 can be designed as individual components. Recesses/spacings can be provided between the bending force introduction sections 28 and/or the middle contact section 29. Alternatively, a joint connection can also be provided instead of the elastic sections between the sections 28, 29 in order to enable more precise guidance.

If actuators 28 are now extended in the direction of arrow A, the outer contact elements 28 exert a force on the inner wall 101 of the pipe 100. As soon as a limit force is exceeded, the outer bending force introduction sections 28 move together with the pipe 100 in the direction of arrow D until the outer sections 35 of the curved underside 12 of the base body 11 come into contact with the inner wall 101 of the pipe 100. The pipe 100 deforms both elastically and plastically. As the outer bending force introduction sections 28 move in the direction of arrow D, the width B between the ribs 31 in the recesses 32 decreases.

If the actuators 28 are now moved back against the direction of arrow A, the outer bending force introduction sections 28 move against the direction of arrow D. The pipe 100 also moves against the direction of arrow D to reduce the elastic deformation until this is reduced and only the plastic deformation of the pipe 100 remains. Meanwhile, the width B of the recesses 32 between the ribs 31 widens accordingly.

Once the actuators 18 are fully retracted again, the underside 22 of the tool element 21 preferably rests completely on the upper side 14 of the base body 11. The pipe bending device 10 is then moved to the next bending point in the pipe 100 and the process described above is repeated.

Springs or similar return elements can be provided to return the movement element 21 to its original position. In addition, elements can be provided for guiding, which hold the movement element 21 in position relative to the base body 11, but at the same time allow the elastic movements of the movement element 21 and the movements in the vertical direction.

Figure 4:
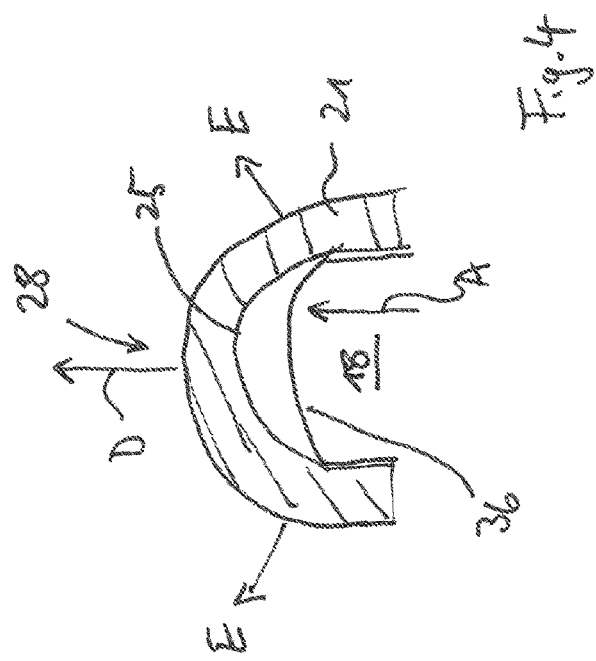

Advantageously, the contact surfaces 25, 26 of the recesses 23, 24 are designed in the shape of cylindrical or spherical sections. Furthermore, it is advantageous that the contact surfaces 36 of the actuators 18, 20 are also designed in the shape of cylindrical sections or spherical sections. It is advantageous if the shape of the contact surfaces 36 is flatter than the shape of the contact surfaces 25, 26. This is shown in FIG. 4. This has the effect that, when the actuator 18, 20 is moved in the direction of arrow A, an outer bending force introduction section 28 and/or a middle contact section 29 is deformed/expanded in the direction of arrow E in order to then adapt to the shape of the inner wall 101 of the pipe 100 in such a way that a cross-sectional deformation of the pipe 100 is counteracted.

Figure 5:
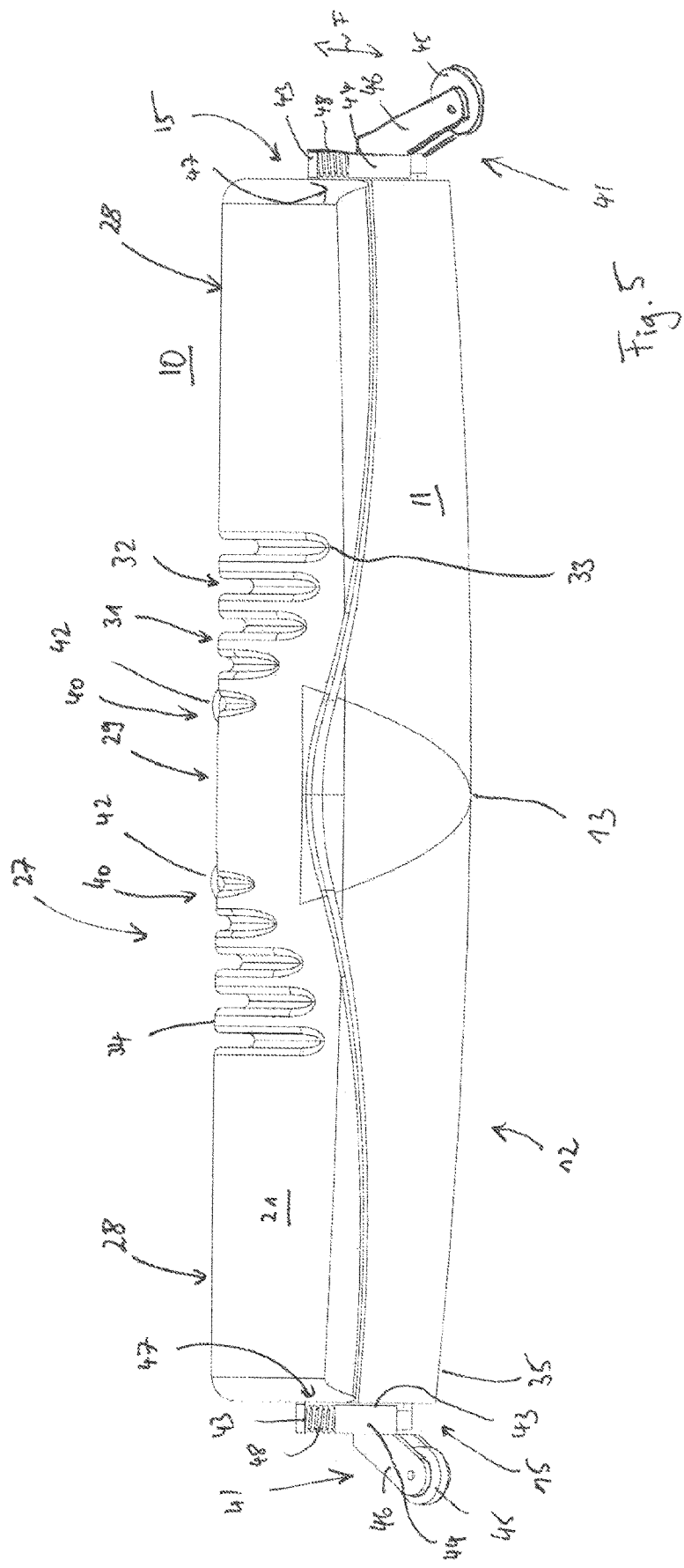
Figure 6:
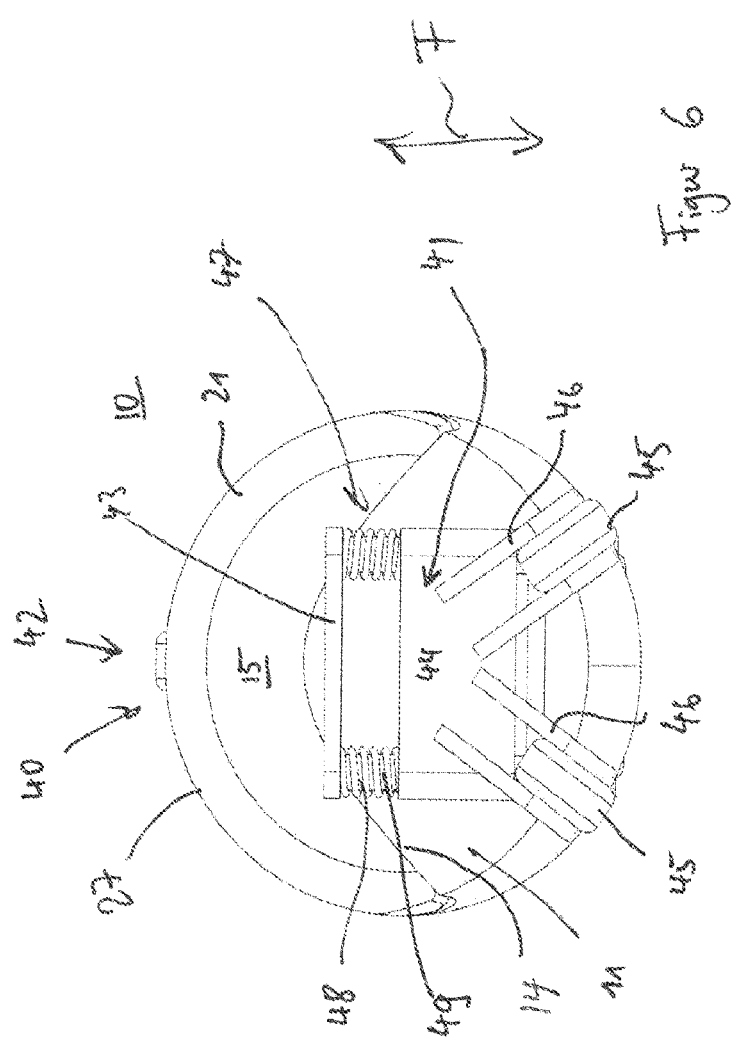

FIG. 5 shows a second pipe bending device 10 according to the invention with an identical structure to the first embodiment according to the invention shown in FIGS. 1 to 4.

In addition, the second embodiment has a chassis. This comprises a running gear element 41 on each of the end faces 15 and rollers 42 attached to the upper side 14 of the base body 11. These are arranged on a carrier not shown and each extend through an opening 40 in the upper side 27 of the tool element 21.

The running gear element 41 comprises a base body 43 which is connected to the end face 15. The base body 43 is movably connected to a support element 44 in the direction of arrow F. Rollers 45 are arranged on the supporting element 44, here preferably at an angle relative to the central vertical of the pipe bending device in coordination with the inner diameter of the pipe, the rollers 45 being arranged on the supporting element 44 via supports 46.

The base body 43 is connected to the support element 44 via pretensioning elements 47, which are preferably spring elements 48, each of which is arranged on a guide 49. The spring elements can also be arranged independently of the guide.

The rollers 45 rest on the inner pipe wall 101 as the pipe bending device 10 moves. Once the bending point is reached, the tool element 21 is pressed in the direction of arrow A against the inner pipe wall 101 via the actuators 18, 20. The tool element 21 is moved past the rollers 42 as they move through the openings 40. When the upper side 27 with the bending force introduction sections 28 reaches the upper inner wall 101, it is pressed against it. This applies a counterforce to the pretensioning element 47 so that the support elements 44 move relative to the base bodies 43 in the direction of arrow F, whereby the spring elements 48 are preferably compressed here. This moves the underside 12 with the contact surface 13 in the direction of the inner pipe wall 101 until the contact surface 13 is in contact and the pipe bending process can begin as described above. Once the pipe bending is complete, the process is reversed.

Figure 7:
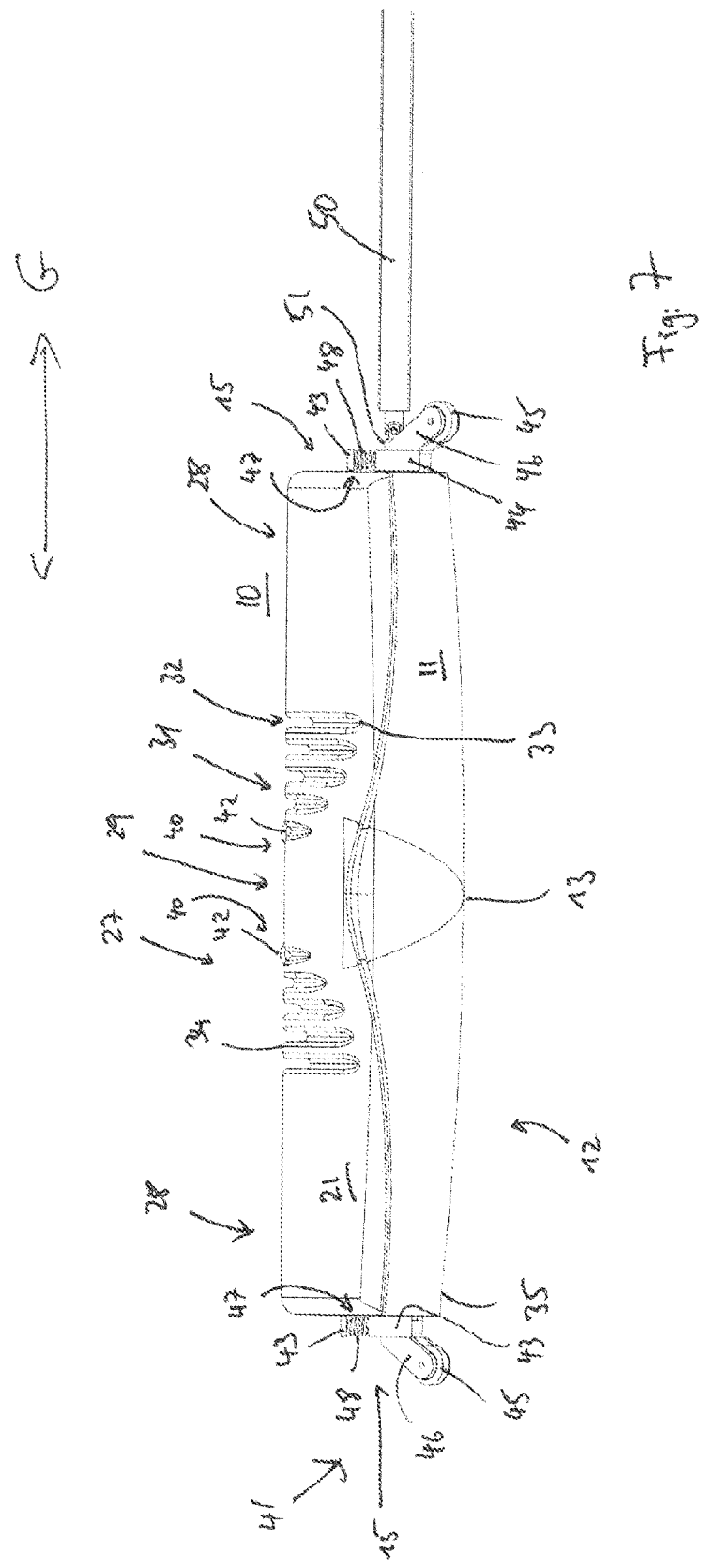
Figure 8:
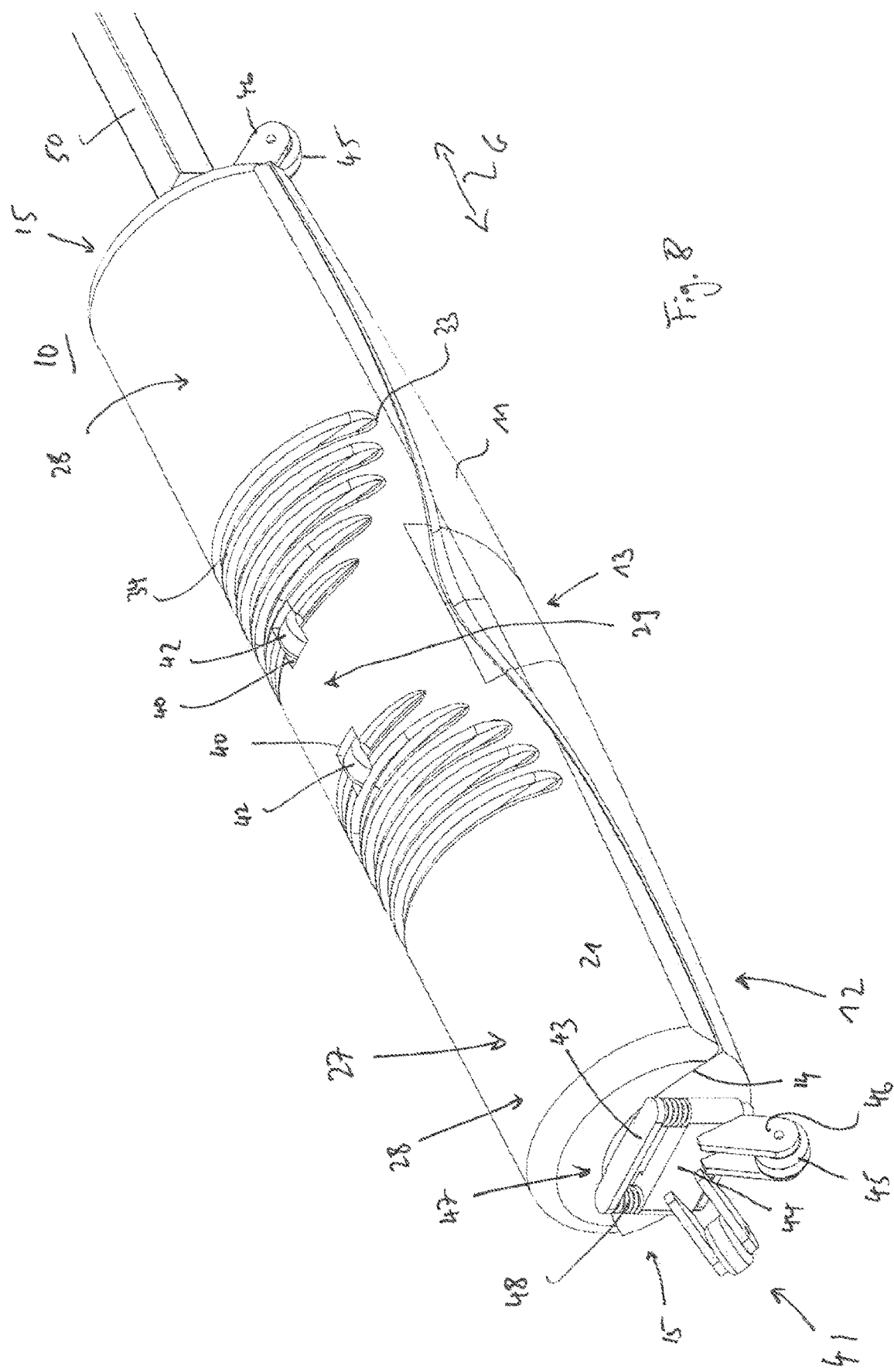
Figure 9:
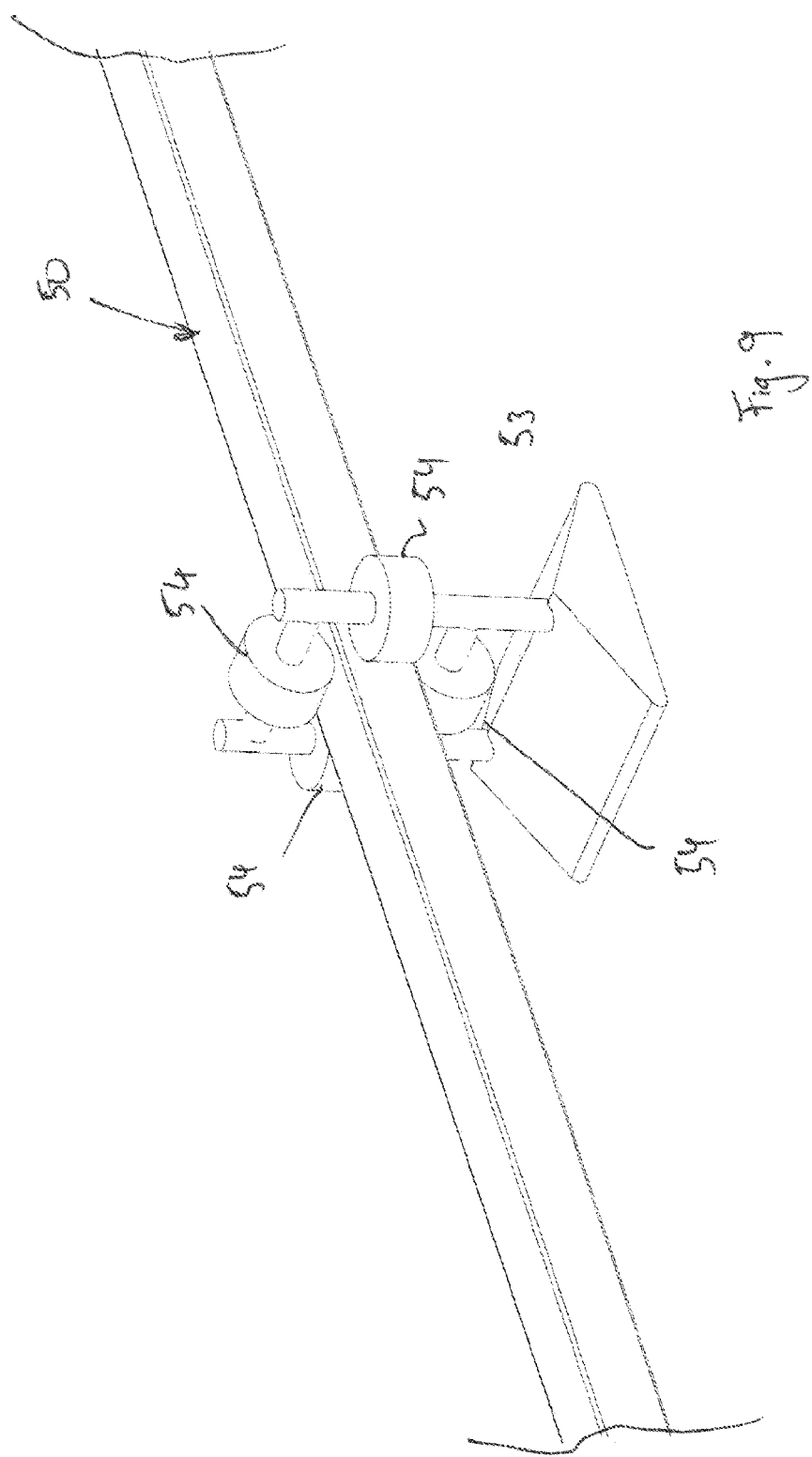

FIGS. 7 to 9 show a third embodiment of a pipe bending device 10 according to the invention with an identical structure to the first and second embodiments according to the invention shown in FIGS. 1 to 6.

In addition, a preferably torsionally rigid push rod 50 is provided, which is connected to an attachment element 51, for example on the end face 15 of the pipe bending device 10, for example via a joint 52. The connection is suitable for transmitting pushing and pulling forces, for example in the direction of arrow G, which are generated by means of a drive not shown and transmitted via the push rod 50 in order to move the pipe bending device 10 in the pipe 100 in the direction of arrow G. In this example, the push rod has a square cross-section. FIG. 9 shows a base element 53, here preferably provided with rollers 54 for driving, guiding and stabilizing the push rod 50.

Figure 10:
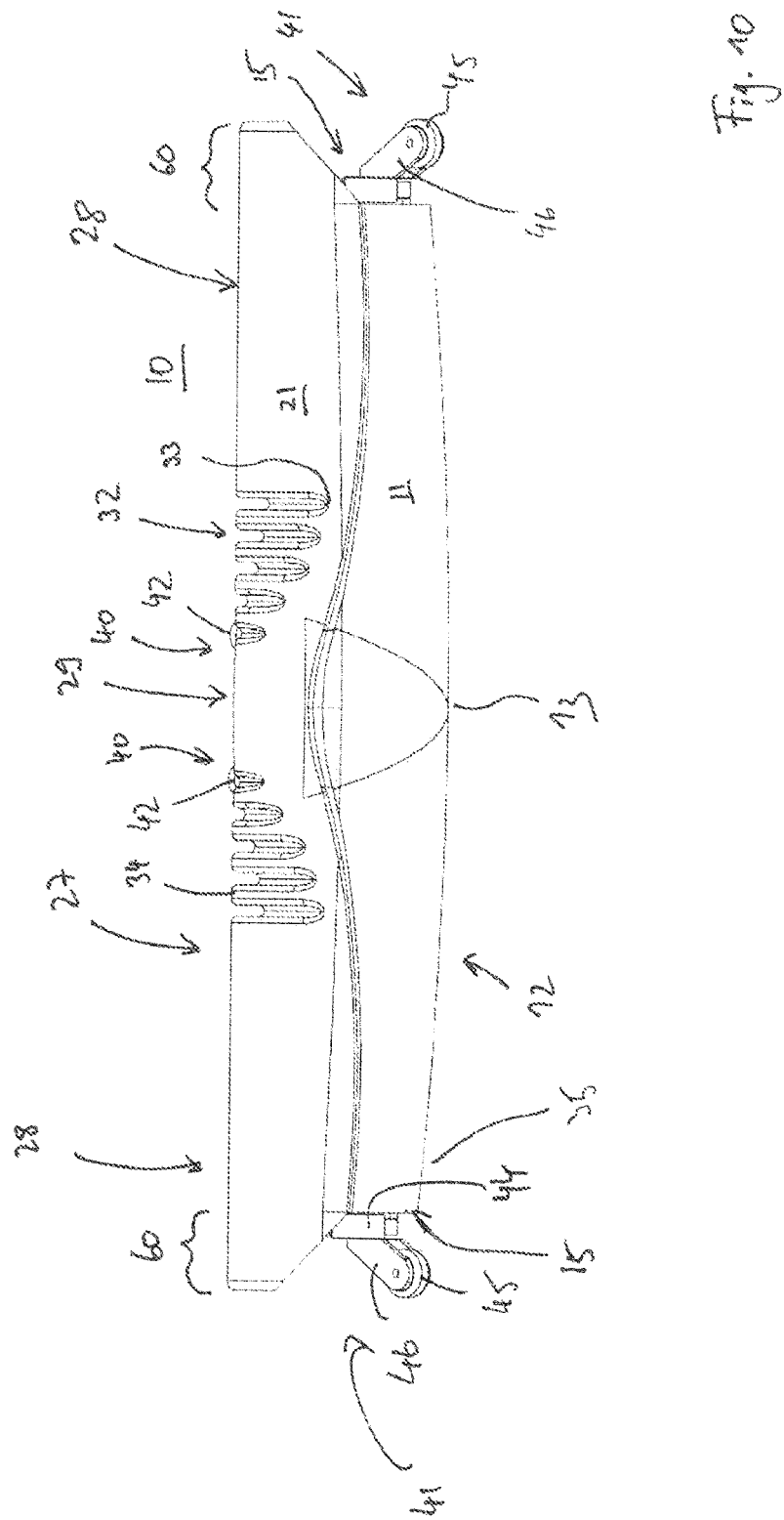
Figure 11:
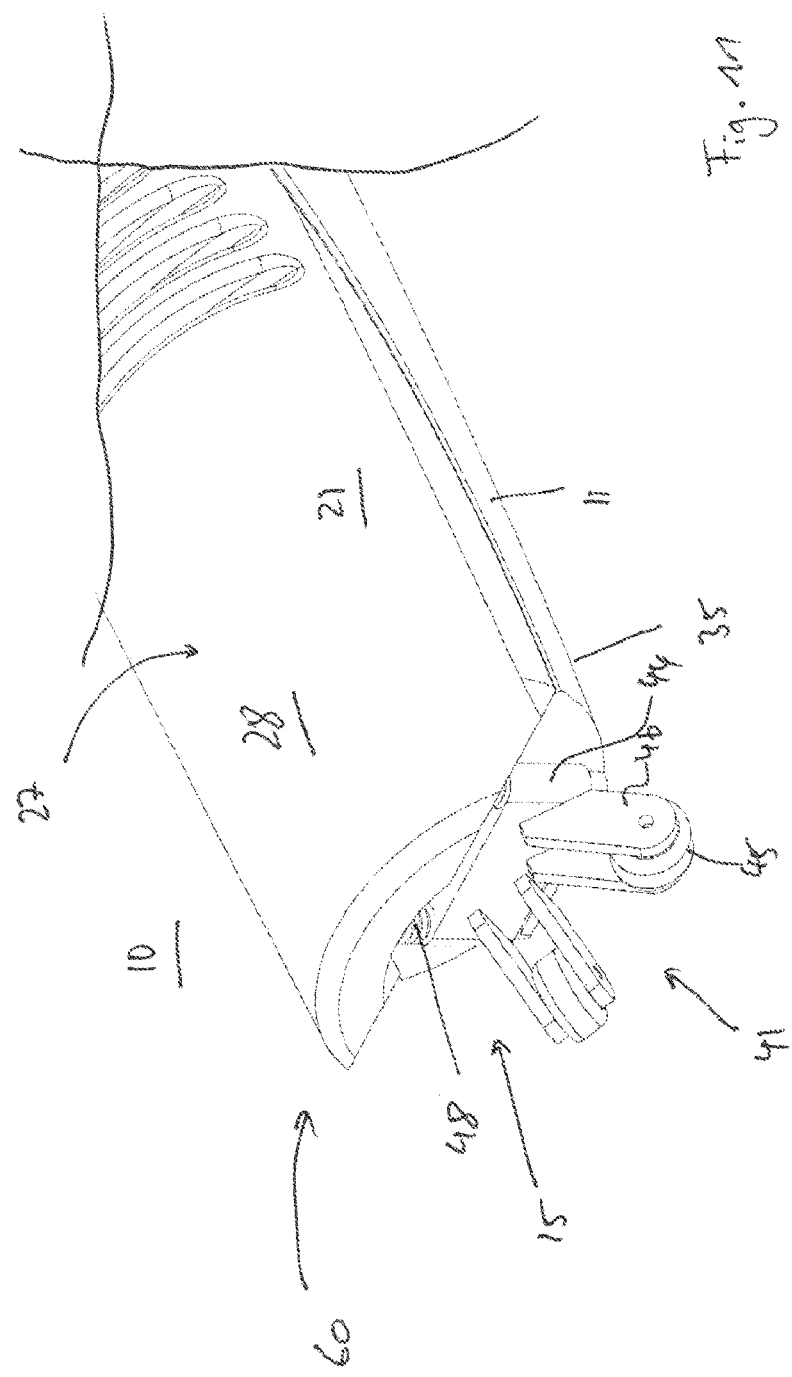
Figure 12:
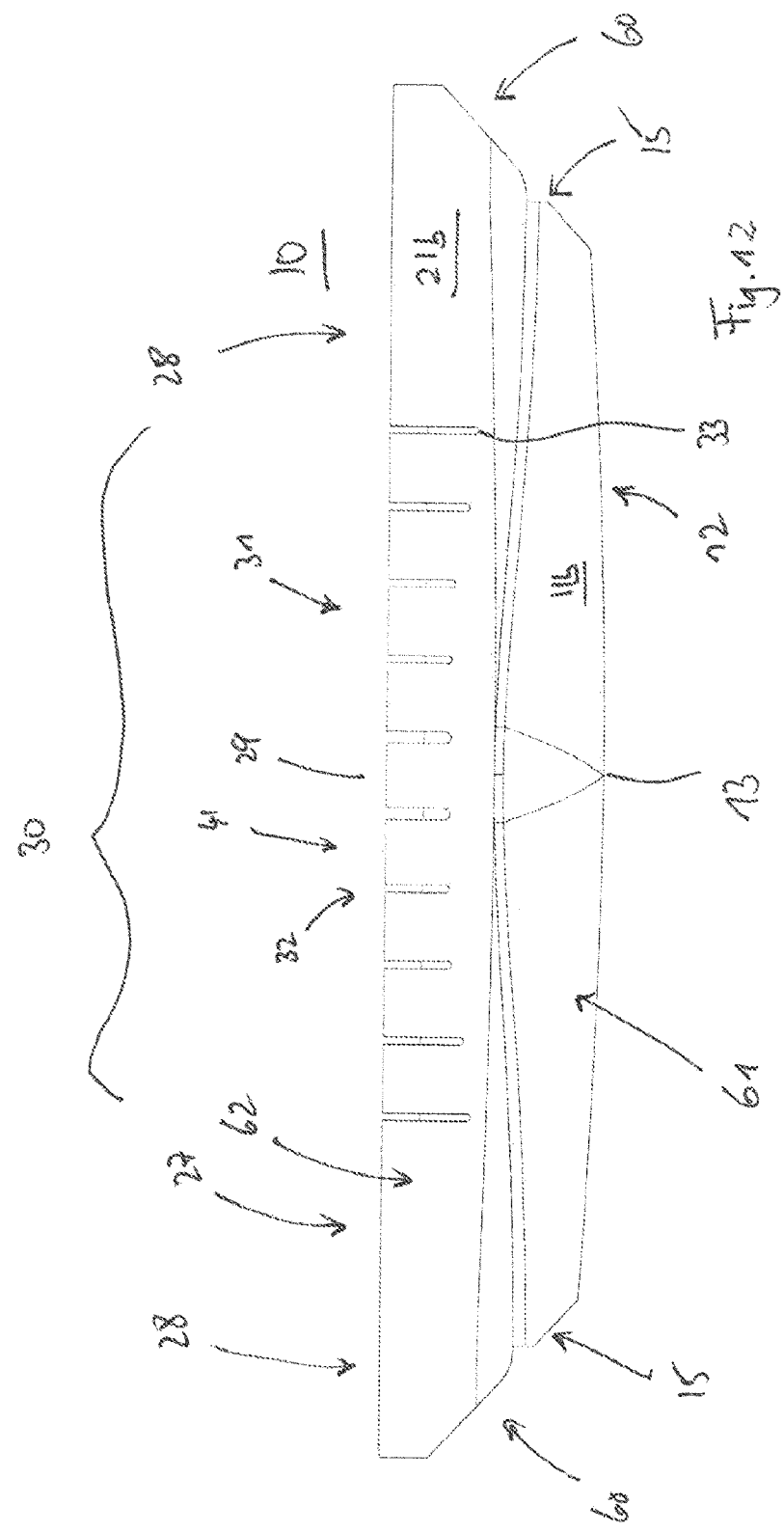
Figure 13:
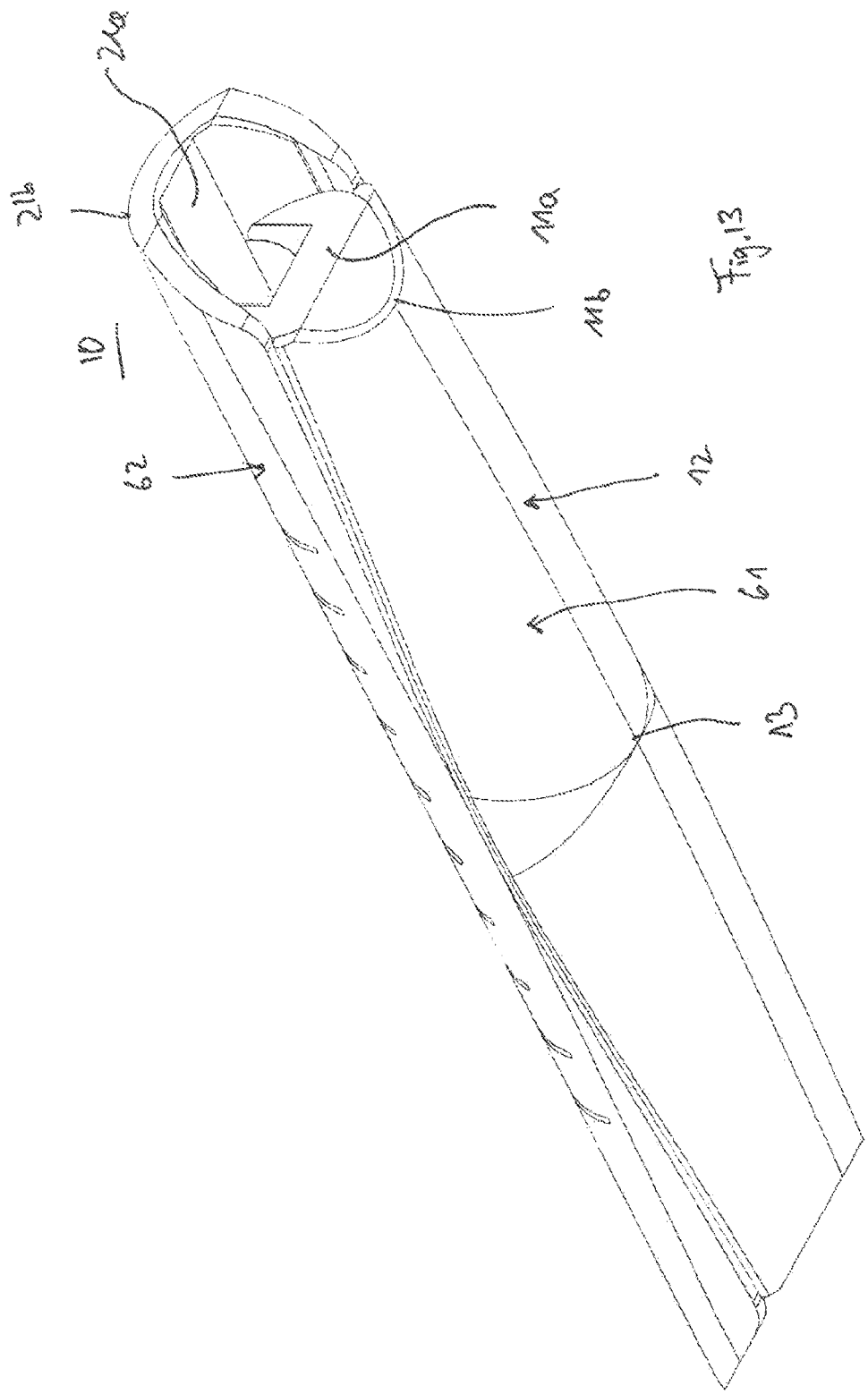
Figure 14:
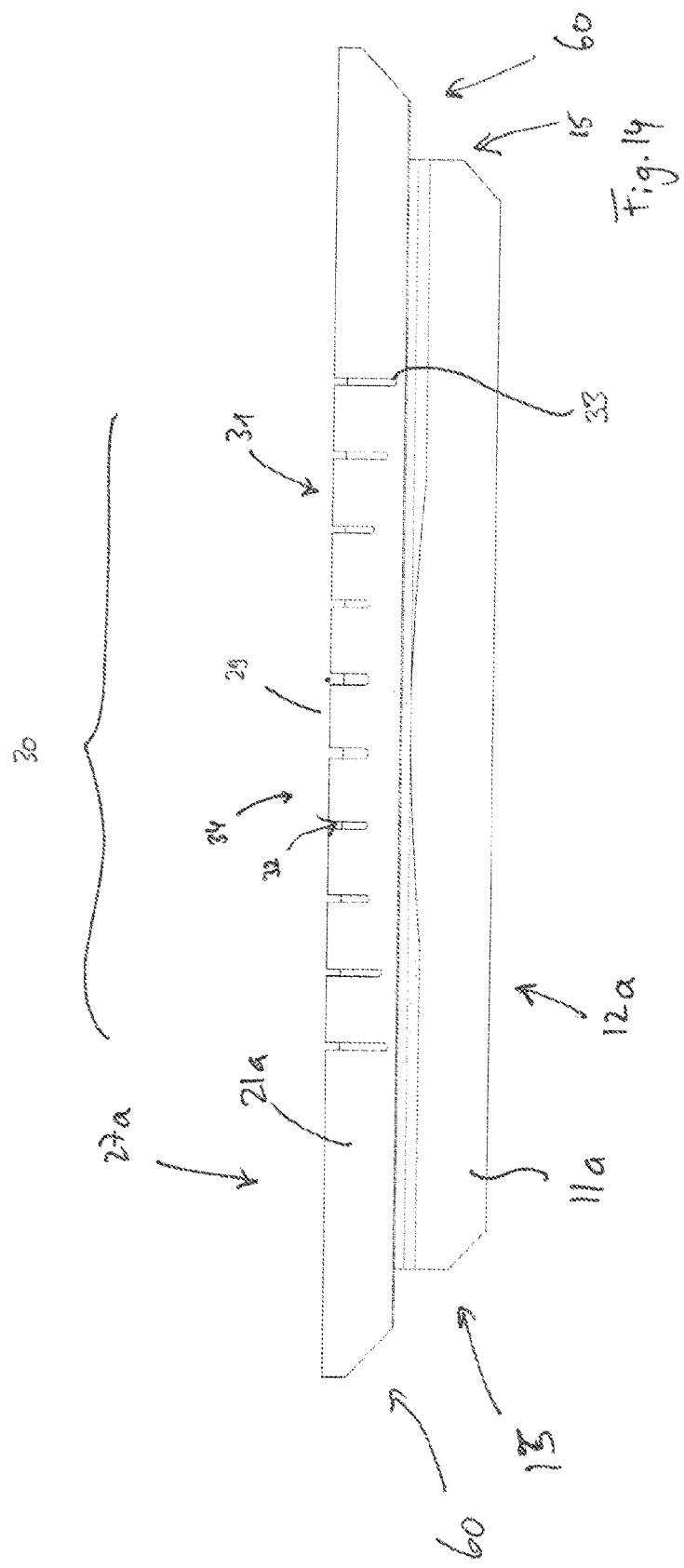
Figure 15:
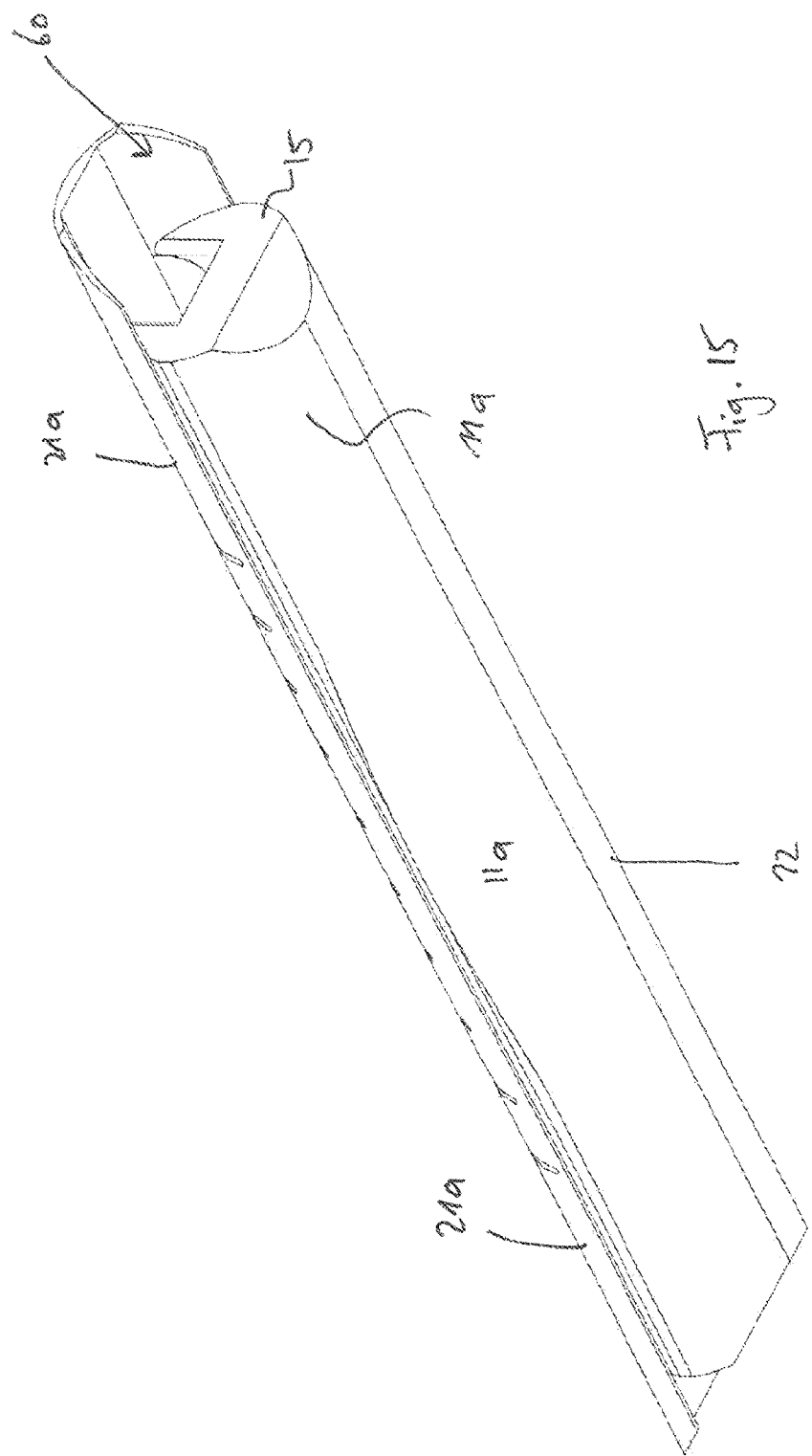
Figure 16:
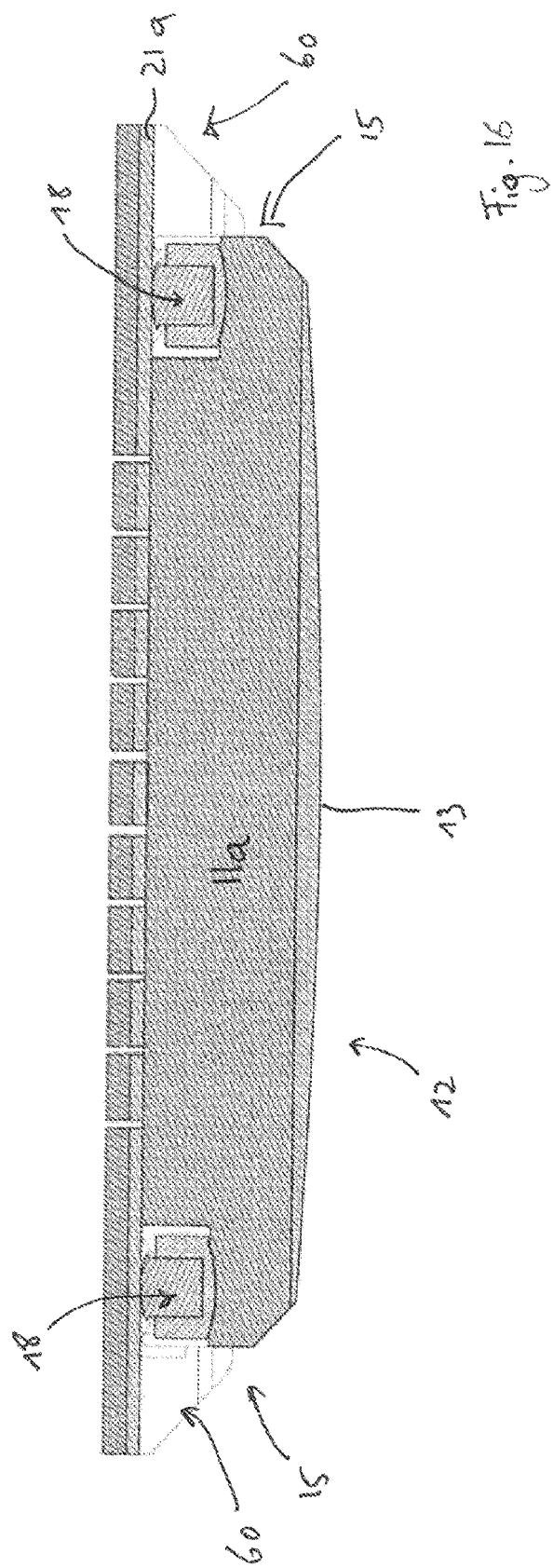
FIG. 16 is a sectional view of the longitudinal axis of FIG. 13, FIG. 17 a side view of a sixth embodiment of a bending device according to the invention, FIG. 18 a sectional view of a part of the sixth embodiment of the device according to the invention transverse to the longitudinal axis, and FIG. 19 a partial view of FIG. 17 in the bent state.

FIGS. 10 and 11 show a fourth embodiment of a pipe bending device 10 according to the invention with an identical structure to the first and second embodiments according to the invention shown in FIGS. 1 to 6. The features of the third embodiment can be added here, but are not shown.

In addition, the tool element 21 is longer than the base body 11, so that there is an overhang area 60 that extends over the chassis elements 41. This simply increases the bending area so that the surface pressure in the pipe is reduced and the final desired total bending can be achieved with fewer bending steps.

FIGS. 12 to 16 show a fifth embodiment of a pipe bending device 10 according to the invention with an identical structure to the first and fourth embodiments according to the invention shown in FIGS. 1 to 4 and 10, 11. Only the ribs 31 of the tool element 21 are flat here. The features of the second and third embodiments can be added here, but are not shown.

The base body 11 and the tool element 21 are constructed in two parts. They each have an inner base body 11a and an outer base body 11b as well as an inner tool element 21a and an outer tool element 21b. The inner base body 11a and inner tool element 21a form the basic structure of the pipe bending device 10 and are preferably made of steel. The basic body 11a has, for example, a flat, non-bent underside 12.

On an underside 12a of the base body 11a, a lower cover element 61, preferably made of plastic, is provided as the outer base body 11b, which also contains the support surface 13. An upper cover element 62, preferably made of plastic, is provided on the upper side 27a of the inner tool element 21a as the outer tool element 21b, the cover also having the bending force introduction sections 28. The structure and function of the pipe bending device 10 of the fifth embodiment otherwise corresponds to that described above.

In a further embodiment, the cover elements 61 and 62 can also be designed as a continuous elastic plastic part.

Figure 17:
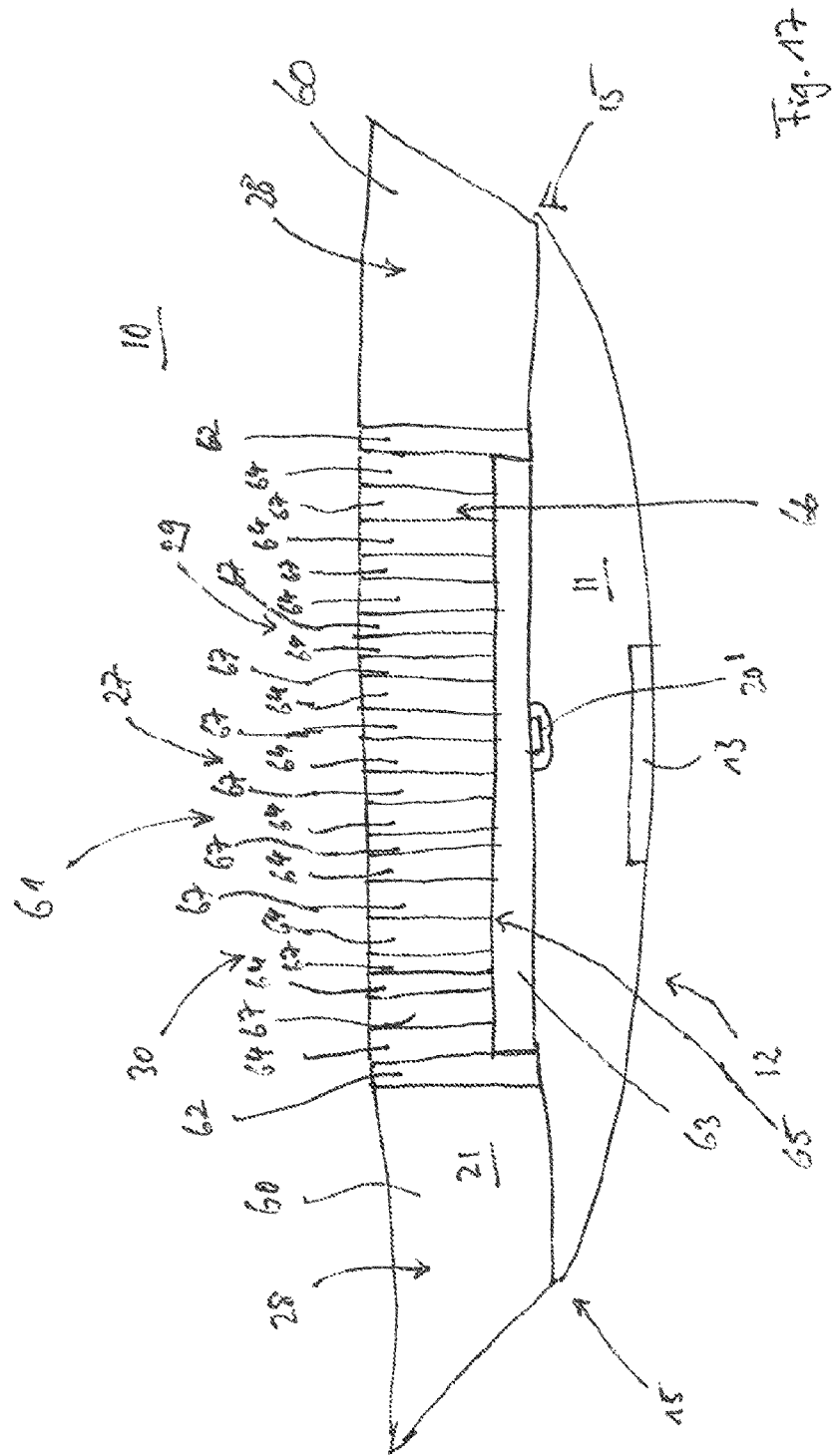
Figure 18:
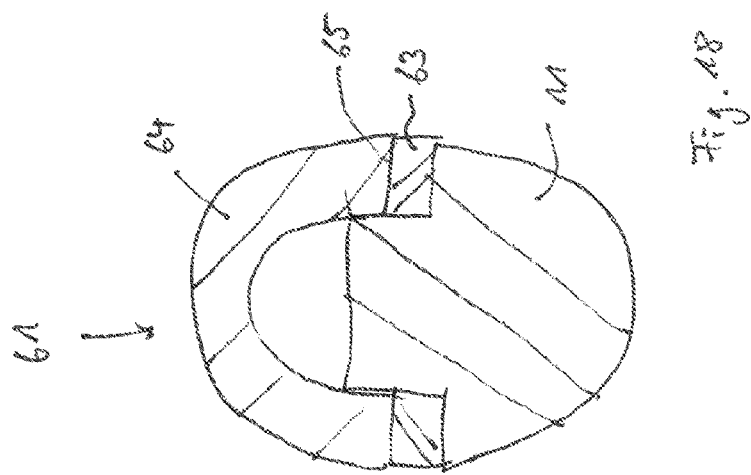
Figure 19:
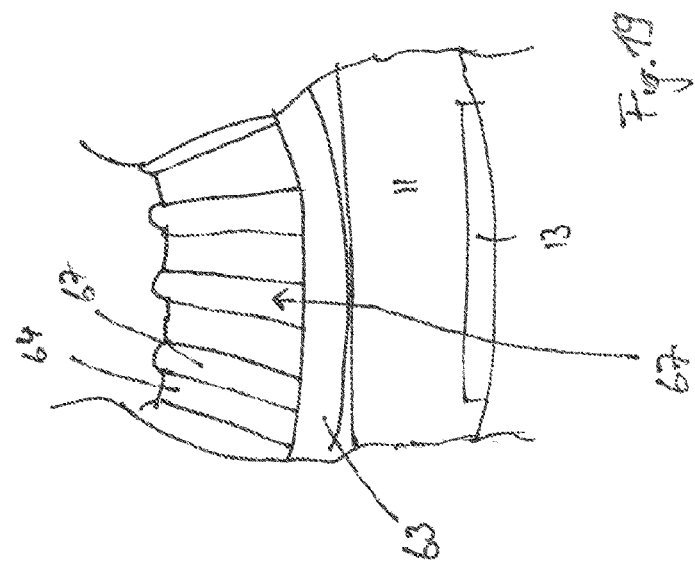

A sixth embodiment of the device 10 according to the invention is shown in FIGS. 17 to 19. The structure of the base body, including the actuators 18, 20, corresponds to the structure shown above.

The tool element 21 has an upper side 27. Preferably, the upper side 27 is designed in such a way that it essentially corresponds to the inner radius of the pipe 100 to be bent in the contact area with the inner wall 101 of the pipe 100. When unloaded, the radius can be smaller or the same size so that the pipe bending device 10 can be moved in and out of the pipe. When loaded, the radius can widen, for example, if necessary.

Preferably, the upper side 27 has two outer bending force introduction sections 28 and a central contact section 29. The bending force introduction sections 28 and the middle contact section 29 are designed as individual components 60, 61.

Preferably, the components 60, 61 are connected to each other via a connecting element 62. This connection is particularly preferred here via a force-fit and/or form-fit connection.

The contact section element 61 is preferably made up of two parallel beams 63. The beams can be in one piece or consist of several parts. The one-piece design is shown here. Furthermore, several bars can also be arranged on top of each other.

The beams 63 are preferably connected to the connecting element 62. In particular, this connection is preferably made via a force-fit and/or form-fit connection.

Rib elements 64, which correspond to the ribs 31, are arranged on the beams 63. These are preferably curved. Furthermore, the rib elements 64 preferably sit loosely on an upper side 65 of the beams 63. The ribs are preferably connected to the beam elements 63 in a radial direction via a positive fit.

A distance 66 is preferably provided between two rib elements, which correspond to the recesses 32. An elastic element 67 is particularly preferably provided in this spacing 66.

Furthermore, it has been found that it is advantageous for improved support that an actuator 20', preferably a hydraulic cylinder, can be provided here (see the sectional view part in FIG. 17), which can exert a force A via the central contact section 29 on the inner wall 101 of the pipe 100 during bending. The actuator 20' can optionally be used to regulate the support effect of the central area with particular precision for very thin-walled pipes, for example. At least one actuator 20' is provided below at least one beam 63 for this purpose.

If a bending force is applied to the tool part 21 via the actuators 18, the beams 63 bend, as shown in FIG. 18. This causes the rib elements 64 to move towards each other and squeeze the elastic elements 67, each of which forms a bead 68 on the outside. The bead 68 presses against the pipe 100 and additionally supports it.

The invention claimed is:

1. Device for the internal bending of pipes for pipelines, comprising a base body positioned in a pipe to be bent, the base body comprising
on at least one side, at least one support surface for an inner wall of the pipe; and
at least one movable tool on a side opposite the support surface for introducing a bending force into the pipe the at least one movable tool being movable relative to the base body via at least one actuator for introducing the bending force;
wherein;
the at least one movable tool comprises a tool element which has at least two bending force introduction sections for introducing the bending force into the pipe, and the bending force introduction sections can be moved relative to the base body by at least one bending force introduction section actuator each;
the at least two bending force introduction sections are disposed in an outer region of the tool element; and
the tool element includes at least one elastic section between the at least two bending force introduction sections connecting the at least two bending force introduction sections.

2. Device according to claim 1, wherein the tool element includes a contact section with the inner pipe wall disposed between two bending force introduction sections.

3. Device according to claim 2, wherein the contact section is movable via one or more contact section actuators.

4. Device according to claim 1, wherein at least one of the bending force introduction and contact sections are elastically deformable.

5. Device according to claim 1, wherein the at least one elastic section is provided at least one of between the at least two bending force introduction sections or between one bending force introduction section and the contact section, wherein the elastic section includes at least one region with a material reduction in the tool element including recesses in the tool element.

6. Device according to claim 5, wherein the at least one region with a material reduction in the tool element is at least partially filled with an elastic material.

7. Device according to claim 1, comprising at least one roller in an upper region of at least one of the base body or the tool element.

8. Device according to claim 7, wherein the at least one roller is in the upper region of the base body and is rigidly connected to the base body.

9. Device according to claim 7, wherein the at least one roller is in the upper region of the tool element and extends through an opening in the tool element.

10. Device according to claim 7, wherein the at least one roller is in the upper region of the base body and the distance between the at least one roller and the base body is adjustable.

11. Device according to claim 1, wherein the tool element is at least partially slotted in its longitudinal direction to allow an elastic expansion in a radial direction.

12. Device according to claim 1, wherein at least one of the base body or the tool element are constructed in two parts.

13. Device according to claim 1, wherein the tool element is constructed in several parts, including at least two bending force introduction sections and a contact section, which are connected to one another.

14. Device according to claim 13, wherein the contact section comprises at least two beams, wherein the beams are connected to the at least two bending force introduction sections, and wherein at least two rib elements are disposed on the beams.

15. Device according to claim 14, wherein the rib elements are formed in an arcuate shape, each of which rests on one side of the beams.

16. Device according to claim 14, wherein the ribs are connected to the bending beam.

17. Device according to claim 14, wherein the at least two rib elements are spaced apart forming a gap.

18. Device according to claim 17, wherein at least one elastically deformable element is provided in the gap.

19. Device according to claim 13, wherein at least one contact section actuator is provided in the region of the contact section.

20. Device according to claim 19, wherein the at least one contact section actuator is arranged centrally under each of the at least two beams.

\* \* \* \* \*